(12) United States Patent
Krebs et al.

(10) Patent No.: US 8,905,209 B2
(45) Date of Patent: Dec. 9, 2014

(54) DUAL CLUTCH

(75) Inventors: Florian Krebs, Baden-Baden (DE);
Rene Daikeler, Buhlertal (DE); Jochen Bergmann, Karlsruhe (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/605,308

(22) Filed: Sep. 6, 2012

(65) Prior Publication Data

US 2012/0325610 A1 Dec. 27, 2012

Related U.S. Application Data

(63) Continuation of application No. PCT/DE2011/000308, filed on Mar. 24, 2011.

(30) Foreign Application Priority Data

Apr. 8, 2010 (DE) .......................... 10 2010 014 191

(51) Int. Cl.
*F16D 21/06* (2006.01)
*F16D 25/10* (2006.01)
*F16D 48/06* (2006.01)

(52) U.S. Cl.
CPC ...... *F16D 48/066* (2013.01); *F16D 2500/1024* (2013.01); *F16D 2500/5016* (2013.01); *F16D 2500/30803* (2013.01); *F16D 2500/3024* (2013.01)
USPC ................. 192/48.606; 192/48.8; 192/110 S

(58) Field of Classification Search
CPC .............................................. F16D 2021/0692
USPC ............. 192/48.603, 48.606, 48.608, 48.609
See application file for complete search history.

(56) References Cited

U.S. PATENT DOCUMENTS

| 6,729,456 | B2 * | 5/2004 | Beneton et al. ............... 192/48.8 |
| 8,607,949 | B2 * | 12/2013 | Noehl et al. ............. 192/48.606 |
| 2002/0060118 | A1 * | 5/2002 | Beneton et al. ............... 192/48.8 |
| 2005/0034955 | A1 * | 2/2005 | Meinhard et al. ............. 192/112 |
| 2006/0289263 | A1 * | 12/2006 | Friedmann et al. .......... 192/48.8 |

FOREIGN PATENT DOCUMENTS

| DE | 19953091 | 8/2001 |
| DE | 10155458 | 5/2002 |
| DE | 102009014474 | 10/2009 |
| DE | 102009030976 | 1/2010 |
| EP | 1479934 | 11/2004 |
| EP | 1524446 | 4/2005 |
| FR | 2829539 | 3/2003 |

* cited by examiner

OTHER PUBLICATIONS

Machine Language translation of DE 102009030976 Jan. 21, 2010.*

*Primary Examiner* — Gene Crawford
*Assistant Examiner* — Mark Manley
(74) *Attorney, Agent, or Firm* — Volpe and Koenig, P.C.

(57) ABSTRACT

A dual clutch for coupling an engine-side input shaft with a first and/or second transmission-side output shaft includes a first clutch which has a first pressure plate that is axially mobile relative to a first counter plate for coupling with a first clutch disk connected to the first output shaft, and a second clutch having a second pressure plate for coupling with a second clutch disk connected to the second output shaft, the second pressure plate being axially mobile relative to a second counter-plate. An actuating device displaces the first and/or second pressure plate, and a spring element is connected to the actuating device and a transmission housing, the spring element being axially resilient. Both the actuating device and the first counter-plate are radially supported mobile in the axial direction. The axial mobility of the dual clutch allows a simple assembly even with components that have work tolerance-related finishing inaccuracies.

12 Claims, 4 Drawing Sheets

DUAL CLUTCH

CROSS-REFERENCE TO RELATED APPLICATIONS

This application is a continuation of PCT/DE2011/000308, filed Mar. 24, 2011, which claims the benefit of German Patent Application No. 102010014191.7, filed Apr. 8, 2010, both of which are incorporated herein by reference as if fully set forth.

BACKGROUND

The invention relates to a dual clutch, by which a motor-side input shaft can be coupled in a motor vehicle to two transmission-side output shafts, arranged coaxially in reference to each other, essentially free from interrupting the traction force.

A dual clutch is known from EP 1 524 446 A1 to couple a motor-side input shaft with two different output shafts arranged coaxially in reference to each other. The dual clutch comprises a first clutch and a second clutch, with the respective clutches each comprising a pressure plate, axially mobile in reference to a counter plate, for coupling the respective clutch to the allocated output shaft. Further, an also rotating clutch cover is provided, which is screwed to the second counter plate, which in turn is screwed to the first counter plate. Further, a fixed actuating device is provided for moving the first pressure plate and/or the second pressure plate. The actuating device is screwed to a transmission housing of a motor vehicle transmission and axially fixed. At the motor side the first counter plate of the dual clutch is connected via a flexible plate ("flex plate") to a crankshaft of an internal combustion engine of a motor vehicle.

There is a constant need to simplify the assembly of the dual clutch to the transmission and the internal combustion engine, even with potentially tolerance-related finishing inaccuracies of the components involved.

SUMMARY

The objective of the invention is to simplify the assembly of a dual clutch even in case of tolerance-related finishing inaccuracies of the components involved.

This objective is attained by various aspects of the preferred embodiments of the invention.

The dual clutch according to the invention for coupling a motor-side input shaft to a first transmission-side output shaft and/or a second transmission-side output shaft comprises a first clutch, which includes a first pressure plate, axially mobile in reference to a first counter plate, to couple to a first clutch disk connected to the first output shaft. Further, the dual clutch comprises a second clutch which includes a second pressure plate, axially mobile in reference to a second counter plate, to couple to a second clutch disk connected to the second output shaft. Additionally, an actuating device is provided to move the first pressure plate and/or the second pressure plate, with a spring element being provided, connected to the actuating device, particularly a flex plate, connected to a transmission housing, with the spring element being embodied spring-elastic in the axial direction. According to the invention both the actuating device and the first counter plate are supported radially mobile in the axial direction.

Due to the axial mobility of the radially supported first counter plate and the axial mobility of the radially supported actuating device the dual clutch can be supported floating in the axial direction at the input shaft and/or at the first output shaft and/or supported radially at the second output shaft. This allows for the dual clutch to be connected to the transmission housing, particularly via the spring element embodied as a flex plate and connected to the actuating device, and to be elastically displaced to the scope of the deflection of the spring element in the axial direction on the first output shaft and/or the second output shaft. Any distance errors of the transmission housing in reference to the input shaft caused by finishing inaccuracies can therefore be easily compensated. Even in case of tolerance-related finishing inaccuracies of the components involved a simple assembly of the dual clutch can be ensured. In particular, the risk of damaging the dual clutch during the assembly is reduced because the dual clutch can elastically deflect in case of an impact or another influencing force in the axial direction and dampen unintended stress. By the ability of axial displacement of the dual clutch already connected to the transmission housing subsequent adjustments of the dual clutch are possible in an easier fashion, because after an axial displacement of the dual clutch certain components can be accessed more easily.

The respective clutch disk may be connected via gears to the respective output shaft in a torque-proof but axially mobile fashion. The first counter plate or the second counter plate may project radially inwardly as a separate component from a radially exterior coupling housing wall and/or from the clutch cover. It is also possible that the first counter plate or the second counter plate is embodied in one piece with the coupling housing wall and/or the clutch cover. For example, a flywheel connected via a motor-side input shaft to one of the counter plates or an output flange of a two-mass flywheel may be embodied. The respective clutch disk may particularly comprise a friction coating at axial face areas pointing away from each other, which may contact a friction coating, perhaps present, of the corresponding counter plate and/or pressure plate in a frictionally engaged fashion in order to close the respective coupling. The respective clutch disk may be connected via gears to the respective output shaft in a torque-proof but axially mobile fashion. The respective pressure plates and the counter plates are particularly embodied as individual functionally separated components, so that for the dual clutch a so-called "four-plate-design" is possible without significantly increasing the required structural space. The dual clutch can particularly be connected directly or indirectly to a motor-side upstream and/or transmission-side downstream vibration damper, particularly a two-mass flywheel and/or centrifugal pendulum and/or mass pendulum. Further, the respective clutch disk may be damped particularly with the help of a two-weight flywheel and/or a centrifugal pendulum and/or a weight pendulum. The dual clutch may particularly be connected via a stiff disk (drive plate) and/or a flexible and/or bendable disk (flex plate) to the input shaft, with here the disk can transfer torque in order to allow introducing the torque of the input shaft into the dual clutch. By the flexible embodiment of the disk any oscillations developing can be damped partially or entirely.

In particular the first counter plate is radially supported via the input bearing at the input shaft and/or at a two-mass flywheel connected to the input shaft, mobile in the axial direction. The input bearing may be directly supported at the input shaft or a projection connected to the input shaft. Further the input shaft may be supported at a primary-side input flange or a secondary-side output flange of the two-mass flywheel. The input bearing may be embodied as a roller bearing, particularly a deep groove ball bearing, with the axial displacement can be provided by the input bearing itself and/or by an axially displaceable connection of the first counter plate to the input bearing. Particularly preferred, the input bearing is embodied as a slide bearing, which allows an axial displacement in a particularly simple fashion. The first counter plate may be radially supported to a relatively wide range in the motor-side direction, so that any radial load to be compensated can easier be distributed to the first counter plate and the actuating device. This way unnecessarily high side loads can be prevented inside the dual clutch.

Preferably, the first counter plate comprises a motor-side projection, protruding in the axial direction, particularly to form a plug-in connection with the two-mass flywheel, with the first counter plate being supported via the projection at the input bearing.

The projection may particularly be embodied as a separate component and for example screwed or riveted to the first counter plate. By the projection a contact surface can be embodied in a particularly simple fashion for the input bearing extending in the axial direction. The axial extension of the particularly tubular projection can be selected almost arbitrarily. Further, the projection may include wings pointing radially outwardly, by which an output flange of the two-mass flywheel can be connected in a torque-proof but axially mobile in a particularly simple fashion. The plug-in engagement developing here allows a simple assembly of the two-mass flywheel to the dual clutch. By the two-mass flywheel rotary oscillations of the input shaft, developing from the motor combustion of the internal combustion engine connected to the input shaft, may be damped or compensated.

In a particularly preferred embodiment the first output shaft can be plugged into the first counter plate via the clearance fit to embody a preliminary centering. The first counter plate or a component connected to the first counter plate may for example show a bore hole, which shows a slightly larger diameter than the exterior diameter of the first output shaft. During the assembly the dual clutch can be supported via the first counter plate at the first output shaft and already be positioned near the intended end position. After the dual clutch has been plugged onto the first output shaft connected to the vehicle transmission a first preliminary centering may result automatically, here. Subsequently, particularly the input bearing may be assembled, resulting in the final centering of the dual clutch. Due to the clearance fit between the first output shaft and the first counter plate it is not necessary during the assembly of the input bearing, which is particularly pressed thereupon, to simultaneously align the dual clutch. Further, after the assembly of the input bearing any unnecessary friction contact between the first counter plate and the first output shaft is avoided by the clearance fit.

Preferably, the first output shaft is supported radially inwardly at the input shaft, particularly via a floating bearing. This way it is not necessary to provide a bearing hub with the input shaft in order to receive and support the interior first output shaft. Instead, the input shaft may comprise a facial recess, particularly a blind bore, in order to support the inner first output shaft and to compensate any forces developing. The first output shaft may be supported via a pilot bearing, particularly inside the input shaft, such that the first output shaft can be additionally stiffened and transfer higher side loads.

In particular, the actuating device can be radially supported at the second output shaft via an output bearing, particularly a radial needle bearing, mobile in the axial direction. The output bearing may particularly comprise a sufficiently large extension in the axial direction, so that the forces engaging the actuating device can be distributed over an appropriately large area. The stress of the output bearing can here be appropriately low. Particularly when the output bearing is embodied as a needle bearing only a small extension develops for the output bearing in the radial direction so that the construction space is not considerably increased in the radial direction. The output bearing may also be embodied as a slide bearing. In particular, a gap may be provided between the actuating device and the exterior output shaft, by which the actuating device is arranged distanced from the exterior output shaft. The gap may particularly be bridged exclusively by the output bearing so that additional supports of the actuating device at the respective output shaft are not necessary, for example via an additional slide bearing.

Preferably the output bearing is arranged at an input side and/or output side axial end of the actuating device. Thus, the output bearing maybe pushed into the actuating device at the input side, i.e. at the motor side, and/or at the output side, i.e. the transmission side. This way, the assembly of the output bearing is simplified. It is not necessary to insert the output bearing with the help of a tool up to a relatively hard to access location, for example centrally in reference to the actuating device, into said actuating device. In particular it is also possible to impress the output bearing into the actuating device so that it is not necessary to axially fixate the output bearing with the help of circlips.

Particularly preferred the actuating device comprises a circumferential bearing rim, projecting radially outwardly particularly in an annular fashion, to contact a bearing surface of the transmission housing and/or a clutch housing pointing radially inwardly, with particularly the curvature of the bearing being selected such that a theoretical center of the curvature of the bearing rim essentially rests on a rotary axis of the first output shaft and the second output shaft. The overturning moments acting upon the actuating device can be compensated by the bearing rim and simultaneously any forces developing in the radial direction can be transferred to the transmission housing and/or the clutch housing. A linear contact is established by the curvature of the bearing rim between the actuating device and the housing so that any canting of the actuating device in the housing is avoided. This facilitates the assembly of the dual clutch at the transmission, because prior to the final centering of the dual clutch a certain extent of a non-parallel positioning of the dual clutch can be permitted in reference to the output shaft connected to the transmission.

In particular, a cap bearing is provided between the actuating device and a clutch cover connected to the first counter plate and/or the second counter plate, with particularly the actuating device at the output side being supported in the axial direction at least partially at the plane of the cap bearing. By the cap bearing any forces developing at the actuating device can be transferred to the clutch cover. Simultaneously it is ensured that the entrained clutch cover can perform a relative motion in reference to the actuating device. In particular when the support of the actuating device occurs in a manner not axially off-set in reference to the cap bearing the forces developing in the actuating device can be transferred via the cap bearing radially outwardly or via the bearing radially inwardly without any unnecessarily high overturning and bending moments developing.

Particularly preferred, the actuating device is connected via a first actuating cup, comprising a first section extending essentially radially, to the first pressure plate and via a second actuating cup, comprising a second section extending essentially radially, to the second pressure plate, with the cap bearing being spaced apart both in reference to the first section of the first actuating cup as well as the second section of the second actuating cup at the input or the output side. When the cap bearing is axially off-set at the input side, i.e. at the motor side, in reference to the first section and the second section, the forces developing can be compensated relatively far inside the dual clutch and be transferred via the clutch cover to the input shaft. A section of the clutch cover projecting in the axial direction is avoided or largely reduced such that accordingly low side leads act upon the clutch cover. When the clutch cover is distanced both from the first section as well as the second section at the output side, i.e. at the transmission side, the first actuating cup and the second actuating cup are arranged essentially inside the clutch cover. This way it is not necessary that the actuating fingers connected to the respective pressure plate must be guided through respective openings of the clutch cover. The clutch cup may instead encompass both the first actuating cup as well as the second actuating cup without any openings being required in the actuating cup, which might weaken the clutch cup. Therefore, the clutch cup may be embodied in a simpler fashion and transfer greater forces.

In particular the cap bearing is arranged in the axial direction next to the actuating device, with the cap bearing being connected to a particularly tubular bracket connected to the actuating device. Due to the fact that it is not necessary for the cap bearing to be arranged radially outside the actuating device the construction space can be reduced in the axial direction. Instead thereof, the cap bearing can be arranged in an area where the cap bearing is arranged in the axial direction at the plane of another component, for example one of the pressure plates. This way, the construction space of the dual clutch is not considerably increased in the axial direction. By the bracket a projection can be formed radially protruding outwardly in order to accept the cap bearing safe from getting lost between the bracket and the actuating device. Particularly at the output side the bracket can be connected, for example via a circlip, to the actuating device in a manner preventing loss. If applicable, the bracket can contact a bearing provided between the actuating device and one of the output shafts and be supported in the radial direction. This leads to a simple design, by which forces developing can be transmitted thereby in a particularly simple fashion.

In particular the actuating device comprises a first piston for the axial movement of the first pressure plate using a first actuating cup and a second piston for the axial motion of the second pressure plate using a second actuating cup, with the deflection path of the first piston essentially being equivalent to the displacement path of the first pressure plate and/or the deflection path of the second piston essentially to the displacement path of the second pressure plate. This way, a directly operated transmission-free clutch is formed. Any deflection of the respective actuating cup does not occur, so that the respective components, allowing the respective actuating cup to deflect, can be waived. Under the assumption of the ideally stiff actuating cup the deflection path of the respective piston is precisely equivalent to the displacement path of the corresponding pressure plate. The displacement path of the respective pressure plate differs from the deflection path of the respective piston therefore only by the path in the axial direction in order to elastically bend the corresponding actuating cup during the operation of the respective clutch.

Preferably the actuating device comprises a first annular pressure cylinder for moving the first pressure plate and a second annular pressure cylinder for moving the second pressure plate, with the first pressure cylinder and the second pressure cylinder being arranged coaxially in reference to each other. By the coaxial arrangement of the annularly embodied pressure cylinders a particularly compact and space-saving design develops for the actuating device. By the compact design of the actuating device said actuating device exhibits a comparably low weight so that the weight of the actuating device can be compensated without problems by the clutch cover.

Particularly preferred, a first actuating cup connected to the first pressure plate is supported via a first cap bearing at an actuating device, and the first cap bearing is at least partially arranged at the plane of the first pressure cylinder and/or the plane of the second pressure cylinder radially inwardly in reference to the first pressure cylinder and/or radially inwardly in reference to the second pressure cylinder. Additionally or alternatively, a second actuating cup connected preferably to the second pressure plate is supported via a second cap bearing at the actuating device and the second cap bearing is at least partially arranged at the plane of the first pressure cylinder and/or at the plane of the second pressure cylinder radially inwardly in reference to the first pressure cylinder and/or radially inwardly in reference to the second pressure cylinder. The first cap bearing and/or the second cap bearing may be arranged in the axial direction essentially at least partially on the same axial plane in reference to the first pressure cylinder and/or the second pressure cylinder so that, seen in the radial direction, the first cap bearing and/or the second cap bearing at least partially overlap the first pressure cylinder and/or the second pressure cylinder. The first pressure cylinder and/or the second pressure cylinder may exhibit a respectively larger diameter so that the first cap bearing and/or the second cap bearing having a respectively smaller diameter can be arranged inside the first pressure cylinder and/or inside the second pressure cylinder. In particular, the first cap bearing and/or the second cap bearing are guided in an essentially axially extending, preferably annular recess of the actuating device and particularly supported both radially inwardly as well as radially outwardly at the actuating device. A first piston that can be operated by the first pressure cylinder is not required to engage the radial inner end of the first actuating cup but may engage the first actuating cup slightly spaced apart from the radially inner end of the first actuating cup. Accordingly, a second piston that can be operated by the second pressure cylinder is not required to engage the radially inner end of the second actuating cup but can engage the second actuating cup at a slight distance from the radial inner end of the second actuating cup. By the spaced apart support of the respective actuating cup forces developing during the operation of the actuating device can be transferred via the respective cup bearing such that any side load developing can be reduced in the respective actuating cup. This way, a simplified design is possible, which particularly allows a simplified transfer of forces developing. Due to the fact that the respective cap bearing is not mandatorily required to be arranged axially next to the actuating device but can be displaced inside thereof in the operating direction the construction space of the dual clutch can be significantly reduced in the axial direction. This allows an appropriate shortening of the output shaft, so that lower side loads develop in the output shafts and/or greater loads can be transmitted. A transmission train with such a dual clutch can here be embodied smaller, more compact, and simultaneously more robustly and with increased performance.

The invention further relates to a transmission train for a motor vehicle with an input shaft at the motor side, a first output shaft at the transmission side, a second output shaft at the transmission side, and a dual clutch for coupling the input shaft to the first output shaft and/or the second output shaft, with the dual clutch as described above which can be further developed. Using the dual clutch a simplified assembly develops for the transmission train, even in case of tolerance-related finishing imprecision of the components involved.

BRIEF DESCRIPTION OF THE DRAWINGS

In the following the invention is explained with reference to the attached drawings based on preferred exemplary embodiments. Shown are.

DETAILED DESCRIPTION OF THE PREFERRED EMBODIMENTS

Figure 1:
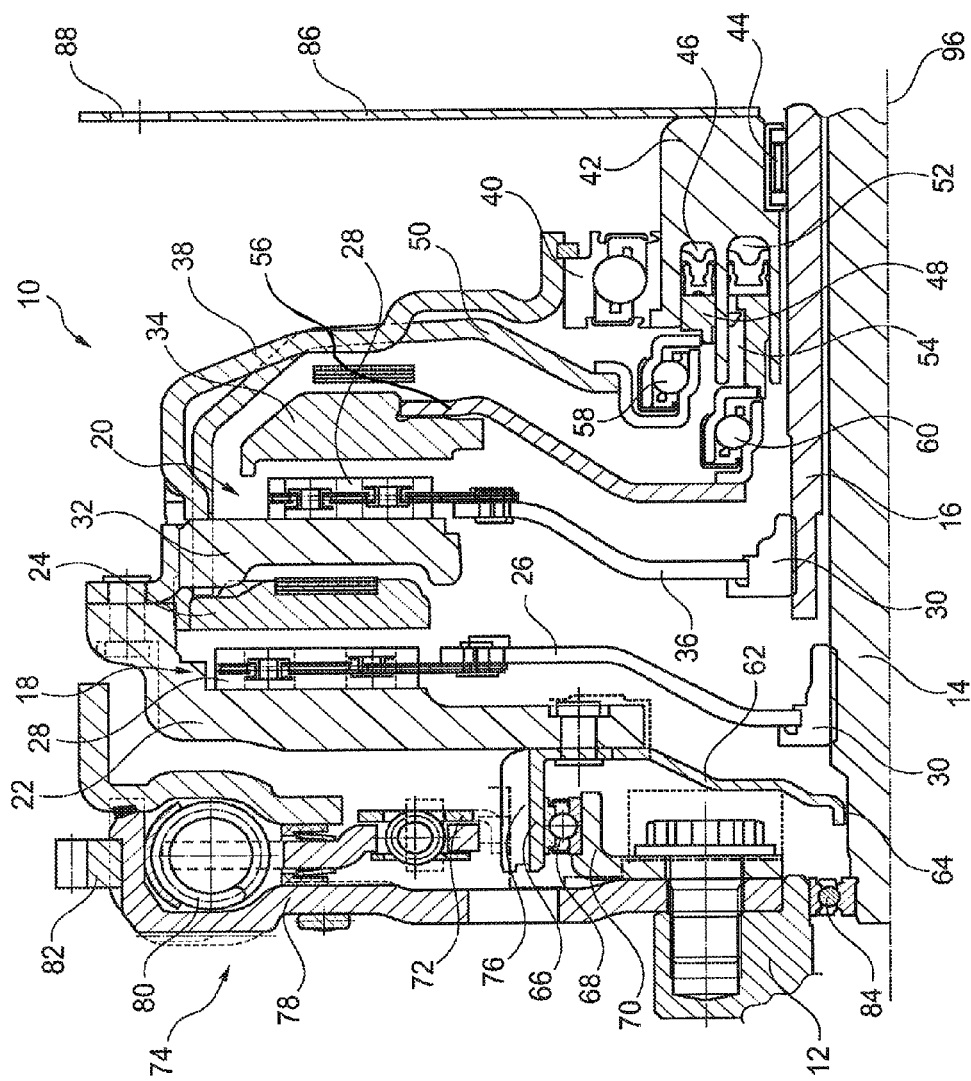
FIG. 1: a schematic cross-section of a dual clutch of a first exemplary embodiment.

The dual clutch 10 shown in FIG. 1 can couple a first input shaft 12 with an inner first output shaft 14 and/or an outer second output shaft 16 arranged coaxially in reference to the first output shaft 14. For this purpose, the dual clutch 10 comprises a first clutch 18 and a second clutch 20. The first clutch 18 comprises a pressure plate 24 axially articulate in reference to a first counter plate 22, in order to couple in a frictionally engaged fashion a first clutch disk 26 via friction coatings 28 arranged between the first counter plate 22 and the first pressure plate 24. The first clutch disk 26 may be connected via gears 30 in a torque-proof but also axially displaceable fashion to the first output shaft 14. Accordingly the second clutch 20 comprises a second pressure plate 34, axially displaceable in reference to a second counter plate 32, in order to couple in a frictionally engaged fashion a second clutch disk 36 via friction coating 28 arranged between the second counter plate 32 and the second pressure plate 34. The second clutch disk 36 can be connected via gears 30 to the second output shaft 16 in a torque-proof but axially displaceable fashion. The first pressure plate 24 is arranged between the first counter plate 22 and the second counter plate 32, with the first counter plate 22 and the second counter plate 32 being embodied as individual components separated from each other.

The first counter plate 22 and the second counter plate 32 are connected to a clutch cover 38, which via a cap bearing 40 is connected to an actuating device 42. The actuating device 42 is embodied in a torque-proof fashion and supported at the second output shaft 16 via an output bearing in the form of a needle bearing 44 to transfer radial forces. The actuating device 42 comprises an annular first pressure cylinder 46, by which a first piston 48 can be displaced. The first pressure plate 24 shifts a first actuating cup 50 purely axially in order to move the first pressure plate 24 onto the first counter plate 22 to close the first clutch 18. The actuating device 42 further comprises a second annular pressure cylinder 52 arranged radially inside and coaxially in reference to the first annular pressure cylinder 46, by which a second piston 54 can be displaced. The second piston 54 can move a second actuating cup 56 in a purely axial fashion in order to move the second pressure plate 34 onto the second counter plate 32 to close the second clutch 20. The first actuating cup 50 is connected via a first cap bearing 58 to the first piston 48. The second actuating cup 56 is connected via a second cap bearing 60 to the second piston 54.

The first counter plate 22 is connected to a socket 62, with the socket 62 comprising an opening 64, which together with the first output shaft 14 forms a clearance fit in order to achieve a first preliminary centering for the dual clutch 10 with the output shafts 14, 16 during the assembly. The socket 62 further comprises a particularly tubular circumferential projection 66, which is connected at its side pointing radially inwardly to the input bearing in the form of a deep groove ball bearing 68. The deep groove ball bearing 68 is supported via a fastening socket 70 connected to the input shaft 12. The side of the projection 66 pointing radially outwardly forms a spline 76 with the projection 66 comprising an output flange 72 of a two-mass flywheel 74. The two-mass flywheel 74 is connected via an input flange 78 to the input shaft 12. The input flange 78 is connected via at least one bow spring 80 to the output flange 72. Further, the input flange 78 is connected to a gear rim 82. Additionally the first output shaft 14 is radially supported via a pilot bearing 84 inside the input shaft 12. The first output shaft 14 may be supported via another bearing, not shown, at the second output shaft 16.

The first counter plate 22 is radially supported by the help of a deep groove ball bearing 68, but embodied axially mobile. Simultaneously the actuating device 42 is radially supported with the help of a needle bearing 44 but embodied axially mobile. This leads to a principally floating support of the dual clutch 10 in reference to the output shafts 14, 16. The axial fixation of the dual clutch 10 occurs with the help of a spring elements connected to the actuating device 42 in the form of a flex plate 86, which is connected via a fastening area 88 to a transmission housing of a motor vehicle transmission, not shown. Using the flex plate 86 the axial position of the dual clutch 10 can be defined in reference to the output shafts 14, 16, with during the assembly an axial displacement of the dual clutch 10 being allowed against the spring force of the flex plate 86.

Figure 2:
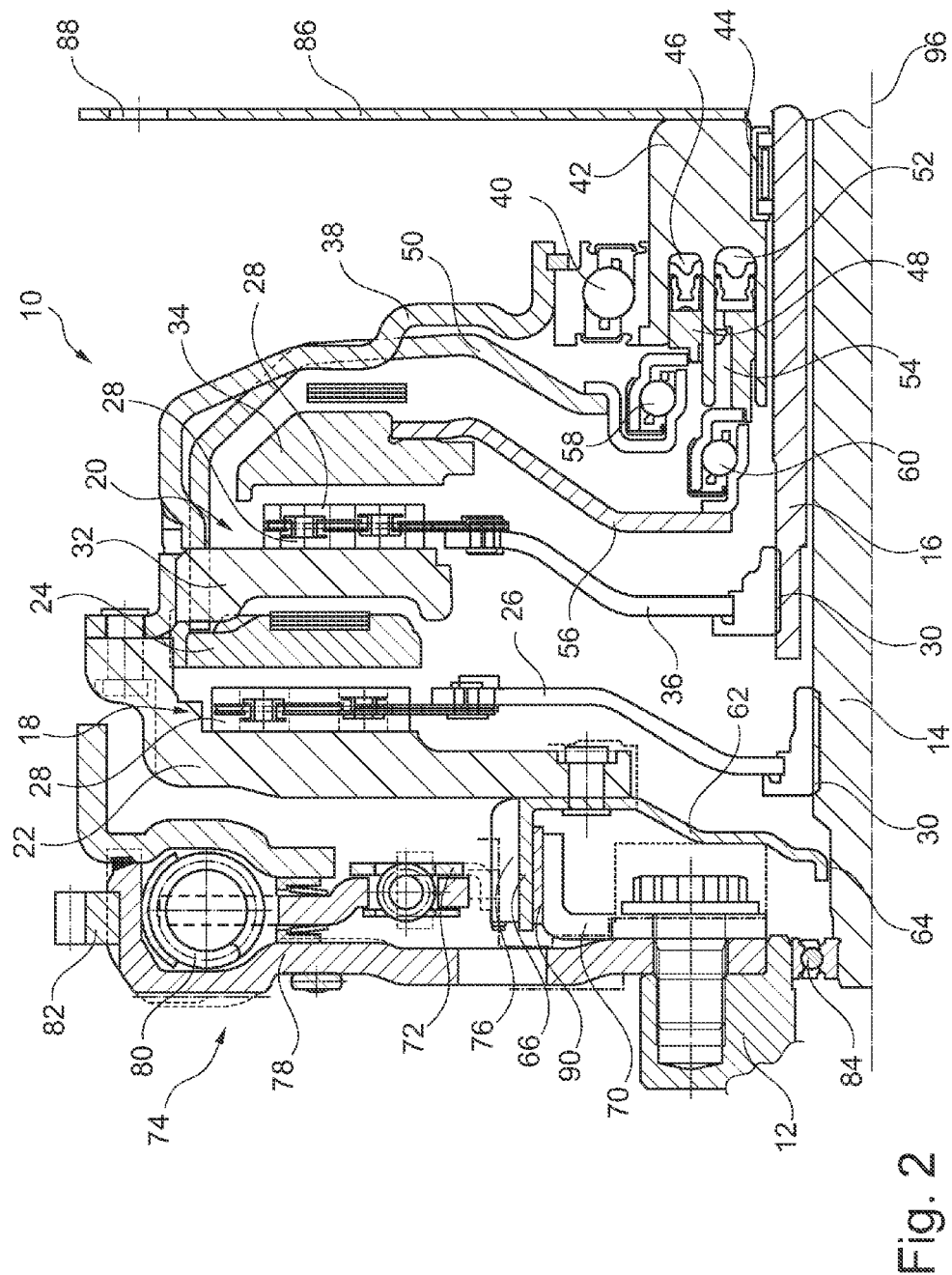
FIG. 2: a schematic cross-section of a dual clutch for a second exemplary embodiment.
Figure 3:
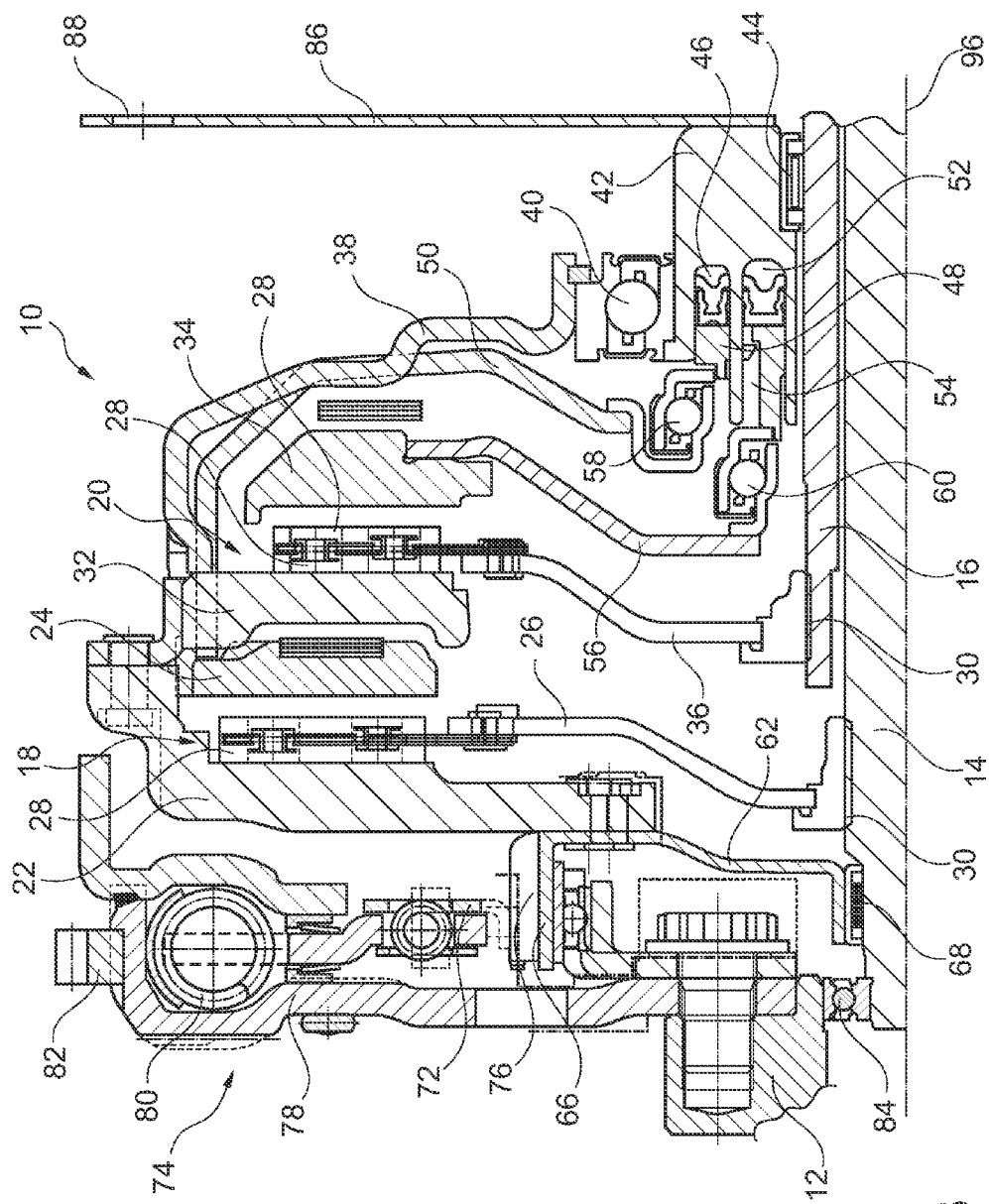
FIG. 3: a schematic cross-section of a dual clutch for a third exemplary embodiment.

In the embodiment of the dual clutch 10 shown in FIG. 2, compared to the embodiment of the dual clutch 10 shown in FIG. 1, the deep groove ball bearing 68 is replaced by a slide bearing 90. Compared to the embodiment of the dual clutch 10 shown in FIG. 1, in the embodiment of the dual clutch 10 shown in FIG. 3 the deep groove ball bearing 68 is supported at the first output shaft 14 and not at the input shaft 12. The deep groove ball bearing 68 may also be replaced by the slide bearing 90 in this embodiment.

Figure 4:
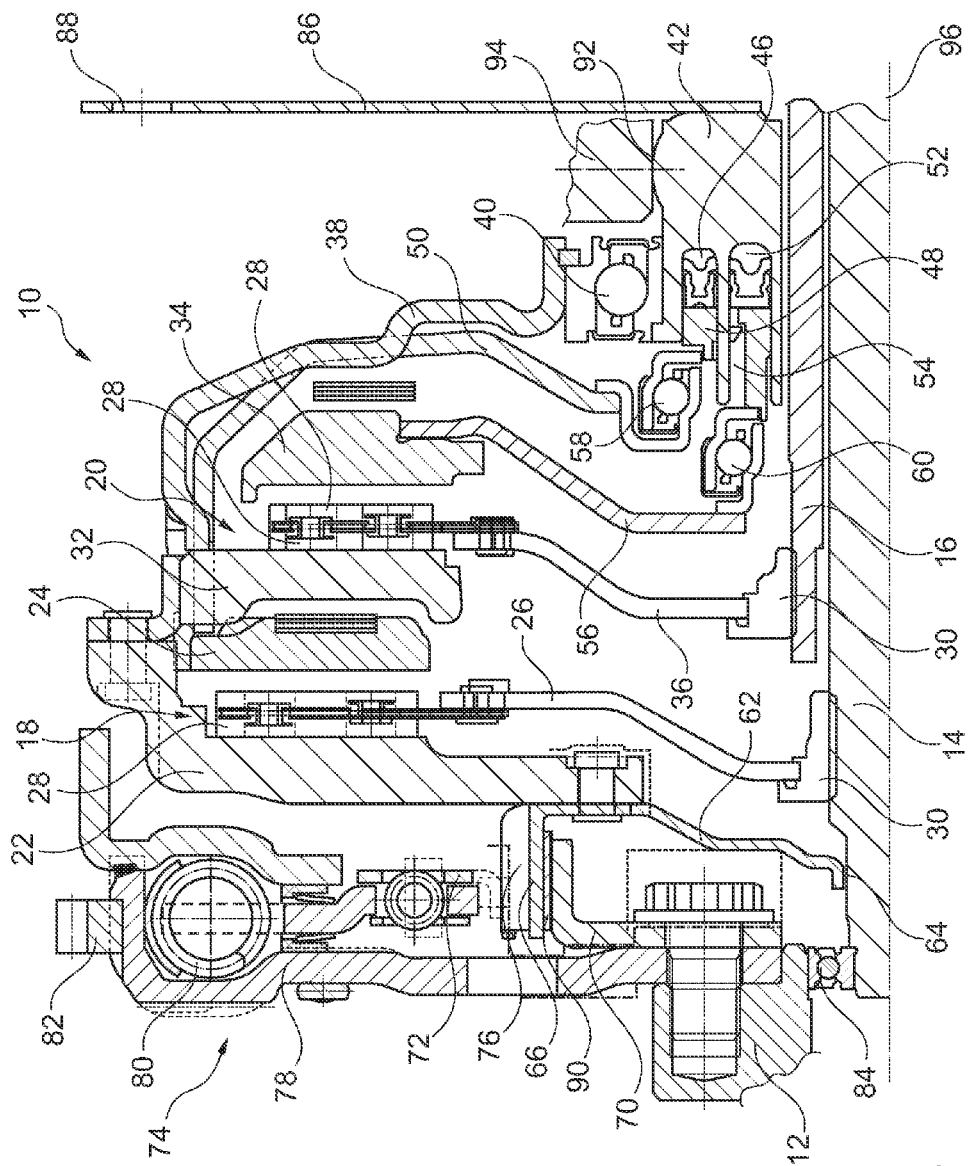
FIG. 4: a schematic cross-section of a dual clutch for a fourth exemplary embodiment.

Compared to the embodiment of the dual clutch 10 shown in FIG. 2, in the embodiment of the dual clutch 10 shown in FIG. 4, the needle bearing 44 is omitted and the actuating device 42 is provided with an essentially spherical, annularly circumferential bearing rim 92, which is inserted in a clutch housing 94. The bearing rim 92 comprises a theoretic center located on a rotary axis 96 of the first output shaft 14 and the second output shaft 16. In this embodiment as well the support of the first counter plate 22 can occur at the motor side, as explained in FIG. 1 or 3.

List of Reference Characters

10 dual clutch
12 input shaft
14 first output shaft
16 second output shaft
18 first clutch
20 second clutch
22 first counter plate
24 first pressure plate
26 first clutch disk
28 friction coating
30 gearing
32 second counter plate
34 second pressure plate
36 second clutch disk
38 clutch cover 40 cap bearing
42 actuating device
44 needle bearing
46 first pressure cylinder
48 first piston
50 first operating cup
52 second pressure cylinder
54 second piston
56 second actuating cup
58 first cap bearing
60 second cap bearing
62 socket
64 opening
66 projection
68 deep groove ball bearing
70 fastening socket
72 output flange
74 two-mass flywheel
76 spline
78 input flange
80 bow spring
82 gear rim
84 pilot bearing
86 flex plate
88 fastening means
90 slide bearing
92 bearing rim
94 clutch housing
96 rotary axis

The invention claimed is:

1. A dual clutch for coupling an input shaft at a motor side to a first output shaft at a transmission side and/or a second output shaft at the transmission side, comprising: a first clutch including a first pressure plate, axially mobile in reference to a first counter plate, to couple to a first clutch disk connected to the first output shaft; a second clutch including a second pressure plate, axially mobile in reference to a second counter plate, to couple to a second clutch disk connected to the second output shaft; an actuating device for moving at least one of the first pressure plate or the second pressure plate; and a spring element connected between the actuating device and a transmission housing; the spring element is embodied elastic in an axial direction; both the actuating device as well as the first counter plate are supported radially and are mobile in the axial direction, a socket is connected to the first counter plate and is radially supported on the first output shaft via a projection with a radially inner surface that is radially supported on an input bearing connected directly to a fastening socket of the input shaft, the projection includes a radially outer surface having a spline for a two-mass flywheel, and the actuating device is radially supported via a first output bearing mobile in the axial direction on the second output shaft.

2. The dual clutch according to claim 1, wherein the first counter plate is radially supported via the two-mass flywheel connected to the input shaft, mobile in the axial direction.

3. The dual clutch according to claim 1, wherein the first output shaft is insertable with a clearance fit to form a preliminary centering in the first counter plate.

4. The dual clutch according to claim 1, wherein the first output shaft is supported via a pilot bearing in the input shaft.

5. The dual clutch according to claim 1, wherein the actuating device comprises a bearing rim projecting radially outwardly to contact at least one of a bearing surface of the transmission housing pointing radially inwardly or a clutch housing, and a curvature of the bearing rim is selected such that a theoretic center of the curvature of the bearing rim is essentially located on a rotary axis of the first output shaft and the second output shaft.

6. The dual clutch according to claim 1, wherein the actuating device comprises a first piston for axial movement of the first pressure plate using a first actuating cup and a second piston for axial movement of the second pressure plate using a second actuating cup, and an operating path of the first piston is essentially equivalent to a displacement path of the first pressure plate and an operating path of the second piston is essentially equivalent to the displacement path of the second pressure plate.

7. The dual clutch according to claim 1, wherein the actuating device comprises a first annular pressure cylinder to move the first pressure plate and a second annular pressure cylinder to move the second pressure plate, and the first pressure cylinder and the second pressure cylinder are arranged coaxially in reference to each other.

8. A dual clutch according to claim 1, wherein the spring element is a flex plate.

9. A dual clutch according to claim 1, wherein the first output bearing comprises a radial-needle bearing.

10. A transmission train for a motor vehicle comprising the input shaft at a motor side, the first output shaft at a transmission side, the second output shaft at the transmission side, and a dual clutch according to claim 1 for coupling the input shaft to at least one of the first output shaft or the second output shaft.

11. The dual clutch according to claim 1, wherein the first counter plate is radially supported via a second output bearing at the first output shaft.

12. The dual clutch according to claim 1, wherein the first counter plate is connected to a socket, and the socket includes an opening which together with the first output shaft forms a clearance fit to center the dual clutch with the first output shaft and the second output shaft.

* * * * *